(12) United States Patent
Ivanov et al.

(10) Patent No.: US 7,348,103 B2
(45) Date of Patent: *Mar. 25, 2008

(54) POLYFLUORINATED BORON CLUSTER ANIONS FOR LITHIUM ELECTROLYTES

(75) Inventors: Sergei Vladimirovich Ivanov, Schnecksville, PA (US); William Jack Casteel, Jr., Emmaus, PA (US); Guido Peter Pez, Allentown, PA (US); Michael Ulman, Alburtis, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 169 days.

This patent is subject to a terminal disclaimer.

(21) Appl. No.: 10/924,293

(22) Filed: Aug. 23, 2004

(65) Prior Publication Data

US 2005/0064288 A1    Mar. 24, 2005

Related U.S. Application Data

(63) Continuation-in-part of application No. 10/655,476, filed on Sep. 4, 2003.

(51) Int. Cl.
*H01M 6/16* (2006.01)
*H01M 2/26* (2006.01)
*H01M 6/04* (2006.01)
*H01M 10/26* (2006.01)

(52) U.S. Cl. ............... 429/342; 429/121; 429/199; 429/207

(58) Field of Classification Search ............ 429/121, 429/199, 207, 342
See application file for complete search history.

(56) References Cited

U.S. PATENT DOCUMENTS

| | | | |
|---|---|---|---|
| 4,020,240 | A | 4/1977 | Schlaikjer |
| 4,071,664 | A * | 1/1978 | Dey ............................ 429/345 |
| 4,201,839 | A | 5/1980 | Johnson et al. |
| 4,331,743 | A | 5/1982 | Dey et al. |
| 5,154,989 | A * | 10/1992 | Howard et al. ............. 429/160 |
| 5,714,279 | A * | 2/1998 | Zajac et al. ................ 429/344 |
| 5,849,432 | A | 12/1998 | Angell et al. |
| 6,159,640 | A | 12/2000 | Appel et al. |
| 6,346,351 | B1 | 2/2002 | Yde-Andersen et al. |
| 6,448,447 | B1 | 9/2002 | Strauss et al. |
| 6,514,474 | B1 | 2/2003 | Kikuyama et al. |
| 6,537,697 | B2 | 3/2003 | Kida et al. |
| 6,696,202 | B2 * | 2/2004 | Arai ....................... 429/231.95 |
| 6,781,005 | B1 | 8/2004 | Casteel, Jr. et al. |
| 6,852,446 | B2 * | 2/2005 | Barbarich .................... 429/207 |
| 2002/0028388 | A1 | 3/2002 | Lee |
| 2002/0177044 | A1 | 11/2002 | Yagi et al. |
| 2003/0129497 | A1 * | 7/2003 | Yamamoto et al. ......... 429/246 |
| 2004/0029010 | A1 * | 2/2004 | Sada et al. ................ 429/231.4 |
| 2005/0053841 | A1 * | 3/2005 | Ivanov et al. ............... 429/324 |
| 2005/0064288 | A1 | 3/2005 | Ivanov et al. |

FOREIGN PATENT DOCUMENTS

TW        249869        2/2006

OTHER PUBLICATIONS

Ivanov et al., "Synthesis and Stability of Reactive Salts of Dodecafluoro-closo-dodecaborate," J. Am. Chem. Soc. Comm. 125, 4694-5 (2003).*
U.S. Appl. No. 10/655,476, filed Aug. 4, 2003, Sergei V. Ivanov, et al.
U.S. Appl. No. 11/197,478, filed Aug. 5, 2005, Sergei V. Ivanov, et al.
U.S. Appl. No. 11/372,907, filed Mar. 10, 2006, Sergei V. Ivanov, et al.
European Search Report No. 04020911.6-2119, dated Dec. 20, 2005.
S. Mori, et al., "Chemical Properties of Various Organic Electrolytes for Lithium Rechargeable Batteries . . . 1. Characterization of Passivating Layer Formed on Graphite in Alkyl Carbonate Solutions", Journal of Power Sources, 68 pp. 59-64 (1997).
D. Aurbach, et al., "Recent Studies on the Correlation Between Surface Chemistry, Morphology, Three-Dimensional Structures and Performance of Li and Li-C Intercalation Anodes in Serveral Important Electrolyte Systems", Journal of Power Sources 68, pp. 91-98 (1997).
S. Flandrois, et al., "Carbon Materials for Lithium-ion Rechargeable Batteries", Carbon 37, pp. 165-180 (1999).
Sergei V. Ivanov, et al., Synthesis and Stability of Reactive Salts of Dodecafluorocloso-dodecaborate(2-), J. American Chemical Society, 2003, vol. 125, No. 16 pgs. 4694-4695.
Abboud, J.L.M, et al., "Critical Compliation of Scales of Solvent Paramenters, Part 1. Pure Non-Hydrogen Bond Donor Solvents"; Pure Appl. Chem., vol. 71, No. 4 pp. 645-718, 1999; pp. 645-718.

(Continued)

*Primary Examiner*—Dah-Wei Yuan
(74) *Attorney, Agent, or Firm*—Michael K. Boyer; Anne B. Kiernan (57) ABSTRACT

The present invention relates to an improvement in lithium secondary batteries comprised of a negative electrode, a positive electrode, a separator, and a lithium-based electrolyte carried in an aprotic solvent and to the electrolyte compositions. The improvement resides in the use of a lithium salt of the formula:

$$Li_2B_{12}F_xZ_{12-x}$$

wherein x greater than or equal to 4 and Z represents H, Cl, and Br.

27 Claims, 2 Drawing Sheets

OTHER PUBLICATIONS

European Search Report completion date Dec. 20, 2005.

Ivanov, Sergei, Miller, Susie; Anderson, Oren; Sointsev, Konstantine, and Strauss, Steven; Synthesis and Stability of Reactive Salts of Dodecafluoro-closo-dodecaborate (2-); Department of Chemistry, Colorado State University, Fort Collins, Colorado and Institute of General and Inorganic Chemistry, Russian Academy of Sciences, Moscow 117907, Russia; J. Am. Chem. Soc. 2003, 125 4694-4695.

Abraham, K. M. et al; "Some Chemistry in the Li/SOCI. Cell;" Journal of the Elecrochemical Society; 1980, vol. 127, p. 2091-2096.

Bowden, W.; Electrochemical Oxidaton of Polyhedral Boron Halide Anions; Journal of Electrochemical Society. vol. 129, 1982; p. 1249-1252.

Handbook of Batteries (3$^{rd}$ edition); edited by Linden: Reddy, McGraw-Hill; 2002.

Xu, Kang; "Nonaqueous Liquid Electrolyte for Lithium-Based Rechargeable Batteries;" Chemical Review; 104, 2004, pp. 4303-4417.

SAFT.com and batterspace.com web pages.

* cited by examiner

FIGURE 1

FIGURE 2 – Thermal Abuse Test Results for Lithium-Ion Cells

POLYFLUORINATED BORON CLUSTER ANIONS FOR LITHIUM ELECTROLYTES

This is a continuation-in-part of U.S. patent application Ser. No. 10/655,476 filed Sep. 4, 2003 having the same title, which is incorporated herein by reference.

BACKGROUND OF THE INVENTION

Lithium secondary batteries, by virtue of the large reduction potential and low molecular weight of elemental lithium, offer a dramatic improvement in power density over existing primary and secondary battery technologies. Here, lithium secondary battery refers to both batteries containing metallic lithium as the negative electrode and batteries which contain a lithium ion host material as the negative electrode, also known as lithium-ion batteries. By secondary battery it is meant a battery that provides for multiple cycles of charging and discharging. The small size and high mobility of lithium cations allow for the possibility of rapid recharging. These advantages make lithium batteries ideal for portable electronic devices, e.g., cell phones and laptop computers. Recently, larger size lithium batteries have been developed and have application for use in the hybrid vehicle market.

The following patents are representative of lithium batteries and electrochemical cells:

U.S. Pat. No. 4,201,839 discloses an electrochemical cell based upon alkali metal-containing anodes, solid cathodes, and electrolytes where the electrolytes are closoborane compounds carried in aprotic solvents. Closoboranes employed are of the formula $Z_2BnXn$ and $ZCRBmXm$ wherein Z is an alkali metal, C is carbon, R is a radical selected from the group consisting of organic hydrogen and halogen atoms, B is boron, X is one or more substituents from the group consisting of hydrogen and the halogens, m is an integer from 5 to 11, and n is an integer from 6-12. Specifically disclosed examples of closoborane electrolytes employed in the electrochemical cells include lithium bromooctaborate, lithium chlorodecaborate, lithium chlorododecabate, and lithium iododecaborate.

U.S. Pat. No. 5,849,432 discloses electrolyte solvents for use in liquid or rubbery polymer electrolyte solutions based upon boron compounds with Lewis acid characteristics, e.g., boron linked to oxygen, halogenatoms, and sulfur. A specific example of an electrolyte solution comprises lithium perchlororate and boron ethylene carbonate.

U.S. Pat. No. 6,346,351 discloses secondary electrolyte systems for a rechargeable battery of high compatibility towards positive electrode structures based upon a salt and solvent mixture. Lithium tetrafluoroborate and lithium hexafluorophosphate are examples of salts. Examples of solvents include diethyl carbonate, dimethoxyethane, methylformate, and so forth. In the background, there is disclosed known electrolytes for lithium batteries, which include lithium perchlorate, lithium hexafluoroarsenate, lithium trifluoromethylsulfonate, lithium tetrafluoroborate, lithium bromide, and lithium hexafluoroantimonate electrolytes incorporated in solvents.

U.S. Pat. No. 6,159,640 discloses electrolyte systems for lithium batteries used in electronic equipment such as mobile phones, laptop computers, camcorders, etc based upon fluorinated carbamates. A variety of fluorinated carbamate salts, e.g., trifluoroethyl-N,N-dimethylcarbamate is suggested.

U.S. Pat. No. 6,537,697 discloses lithium secondary battery using a nonaqueous electrolyte including lithium tetrakis(pentafluorophenyl)borate as an electrolyte salt.

As represented above a wide variety of lithium-based electrolytes comprising a lithium salt for lithium batteries are disclosed and, although having use in many electronic applications, they are faced with problems associated with safety, oxidative stability, thermal stability, and so forth. Fluorinated electrolyte salts have had the additional problem that toxic HF can be produced on compound breakdown. The following are some of the deficiencies associated with specific electrolyte salts: lithium hexafluorophosphate fails primarily on the basis that it is unstable, generating HF, which leads to electrode corrosion, particularly with $LiMn_2O_4$ cathode materials; lithium perchlorate has relatively low thermal stability leading to explosive mixtures above 100° C.; lithium hexafluoroarsenate has a problem of arsenic toxicity; and lithium triflate lead to significant corrosion of aluminum current collectors typically used in lithium ion batteries.

BRIEF SUMMARY OF THE INVENTION

The present invention relates to lithium secondary batteries comprising a negative electrode, a positive electrode and a lithium based electrolyte salt of the formula:

$$Li_2B_{12}F_xZ_{12-x}$$

wherein x is greater than or equal to 4, or 5, preferably at least 8, or at least 10 but not more than 12 or 11 and Z represents H, Cl, and Br. Preferably, when x is less than 12, Z is H, Br or Cl.

Some of the advantages associated with the use of the fluorinated lithium borohydride salt for forming the lithium-based electrolyte may include:

an ability to use a lithium based salt for an electrolyte solution which has electrochemical, thermal, and hydrolytic stability;

an ability to use a lithium electrolyte solution which can be used at a low lithium based salt concentration, e.g., one-half the concentration of many other lithium based salts, e.g., $LiPF_6$; and, an ability to form low viscosity, low impedance lithium electrolyte solutions which can be recycled.

DETAILED DESCRIPTION OF THE INVENTION

A lithium secondary battery, capable of multiple cycles of charging and discharging, is dependent on an electrolyte conducting solution carrying lithium ions. The two major requirements for lithium battery electrolyte solutions are: (a) a high conductivity in a non-aqueous ionizing solution, and (b) chemical stability to both heat, hydrolysis and particularly to electrochemical cycling over a wide potential range. Other desired features of lithium electrolyte solutions include: high flash point; low vapor pressure; high boiling point; low viscosity; good miscibility with solvents customarily employed in batteries, especially ethylene carbonate, propylene carbonate and alpha-omega-dialkyl glycol ethers;

good electrical conductivity of their solutions over a wide temperature range, and tolerance to initial moisture content.

The present lithium secondary battery is characterized in that the lithium based electrolyte salt for forming lithium electrolyte solutions is based upon a lithium fluorododecaborate of the formula:

$$Li_2B_{12}F_xZ_{12-x}$$

where x is greater than or equal to 4 or 5 (average basis), preferably at least 8, and most preferably at least 10 but not more than 12, or 11, and Z represents H, Cl, and Br. Specific examples of lithium based fluorinated dodecaborates include: $Li_2B_{12}F_5H_7$, $Li_2B_{12}F_6H_6$, $Li_2B_{12}F_7H_5$, $Li_2B_{12}F_8H_4$, $Li_2B_{12}F_9H_3$, $Li_2B_{12}F_{10}H_2$, $Li_2B_{12}F_{11}H$ and mixtures of salts with varying x such that the average x is equal to or greater than 5, or equal to 9 or 10, or $Li_2B_{12}F_xCl_{12-x}$ and $Li_2B_{12}F_xBr_{12-x}$ where x is 10 or 11.

The lithium salt employed for forming electrolytes solutions for use in lithium batteries can be formed by fluorinating hydridodecaborates initially to provide a fluorododecaborate having at least 5, preferably at least 8 and most preferably at least 10 but not more than 12 or more hydrogen atoms replaced with fluorine (average basis). Lithium-ion metathesis gives the lithium salt. This reaction is carried out in a liquid medium. In direct fluorination, fluorine is diluted with an inert gas, e.g., nitrogen. Fluorine concentrations from 10 to 40% by volume are commonly employed. If further halogenation is desired, the partially fluorinated hydridoborate is reacted with the desired halogen, e.g., chlorine or bromine.

Unlike the formation of lithium bromoborates and chloroborates, the formation of the highly fluorinated lithium fluorododecaborates, e.g., those having at least 10 fluorine atoms is extremely difficult. Complete fluorination of the lithium hydridoborate can be effected, but because of the reactive nature of fluorine, there is associated attack of the hydridoborate, which leads to yield loss.

To facilitate formation of the lithium fluoroborates as electrolyte salts, direct fluorination of the lithium hydridoborate is carried out in an acidic liquid medium, e.g., an acidic liquid medium or carrier such as neat or anhydrous HF reduced in acidity by the incorporation of an acid. Examples of acids include formic, acetic, trifluoroacetic, dilute sulfuric triflic, and sulfonic acids hydrohalic ($HCl_{(aq)}$, $HBr_{(aq)}$, $HI_{(aq)}$, and $HF_{(aq)}$). The addition of buffering salts, e.g., alkali metal fluorides such as potassium and sodium fluoride, also can reduce the acidity of neat HF in the fluorination reaction. A Hammett acidity, $H_o$, between $0>H_o>-11$ is preferred as an acidic medium for effecting fluorination.

Radical scavengers can be used in the fluorination of lithium hydridododecaborates to reduce byproduct formation and improve reaction efficiency. In aqueous solutions, radical scavengers appear to limit the formation of hydrogen peroxide, or HOF which may be generated with fluorine. Radical scavengers are used to adjust acidity, and inhibit the side-reaction of fluorine with the solvent, thereby improving fluorination efficiency. Examples of radical scavengers include oxygen, and nitroaromatics. A simple method for introducing a radical scavenger is to introduce a small amount of air to the liquid medium.

Fluorination of the hydridoborate anion can be carried out over a temperature range sufficient to maintain liquid phase conditions. For effecting the fluorination of the dodecaborate anion the temperature generally ranges from −30 to 100° C., typically from 0 to 20° C. Pressures during fluorination are such as to maintain liquid phase conditions, typically atmospheric for the fluorination of the dodecaborate anion.

In the formulation of an electrolyte solution for a lithium battery, the lithium salt is carried in an aprotic solvent. Typically, these aprotic solvents are anhydrous, and anhydrous electrolyte solutions are preferred. Examples of aprotic solvents or carriers for forming the electrolyte systems include dimethyl carbonate, ethyl methyl carbonate, diethyl carbonate, methyl propyl carbonate, ethyl propyl carbonate, dipropyl carbonate, bis(trifluoroethyl)carbonate, bis(pentafluoropropyl)carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., fluorinated oligomers, dimethoxyethane, triglyme, dimethylvinylene carbonate, tetraethyleneglycol, dimethyl ether, polyethylene glycols, sulfones, and gamma-butyrolactone.

In another embodiment, the electrolyte system of the present invention can comprise an aprotic gel polymer carrier/solvent. Suitable gel polymer carrier/solvents include polyethers, polyethylene oxides, polyimides, polyphosphazines, polyacrylonitriles, polysiloxanes, polyether grafted polysiloxanes, derivatives of the foregoing, copolymers of the foregoing, crosslinked and network structures of the foregoing, blends of the foregoing, and the like, to which is added an appropriate ionic electrolyte salt. Other gel-polymer carrier/solvents include those prepared from polymer matrices derived from polypropylene oxides, polysiloxanes, sulfonated polyimides, perfluorinated membranes (Nafion™ resins), divinyl polyethylene glycols, polyethylene glycol-bis-(methyl acrylates), polyethylene glycol-bis(methyl methacrylates), derivatives of the foregoing, copolymers of the foregoing, crosslinked and network structures of the foregoing.

The solution of aprotic solvent and fluorinated lithium dodecaborate salt employed for forming the lithium based electrolyte for the lithium battery typically will have a concentration of lithium fluorododecaborate of at least 0.01 or 0.05 to 1 molar and preferably from 0.1 to 0.6 molar or from 0.2 to 0.5 molar. Higher concentrations tend to become too viscous and, the bulk conductivity characteristics are adversely affected. Also, solutions formed from lithium based fluoroborates having an increased concentration of halogen atoms other than fluorine show an increase viscosity to the lithium fluoroborates having higher fluorine content.

Other lithium based salts can be used in combination with the lithium based fluoroborates, e.g. $LiPF_6$, lithium perchlorate, lithium hexafluoroarsenate, lithium trifluoromethylsulfonate, lithium tetrafluoroborate, lithium bromide, and lithium hexafluoroantimonate as desired. The salts of this invention can be used in combination with other salts in any amounts. If such salts are used, they may be added in any (or small) amounts to the lithium fluoroborate based electrolyte here or the lithium based fluoroborates may be added to the batteries employing other based lithium salt in any (or small) amounts.

The lithium battery employing the lithium fluorododecaborate electrolyte can be any using a cathode and a negative anode. In forming the lithium battery, the negative electrodes for use in a lithium secondary battery typically can be based generally upon non-graphitizing carbon, natural or artificial graphite carbon, or tin oxide, silicon, or germanium compound. Any of the conventional anode compositions may be used in combination with the lithium fluorododecaborate electrolytes here.

The positive electrode for use in lithium secondary batteries typically can be based upon a lithium composite oxide with a transition metal such as cobalt, nickel, manganese, etc., or a lithium composite oxide, part of whose lithium sites or transition metal sites is replaced with cobalt, nickel, manganese, aluminum, boron, magnesium, iron, copper, etc. or iron complex compounds such as ferrocyan blue, berlin green, etc. Specific examples of lithium composites for use as positive electrodes include $LiNi_{1-x}Co_xO_2$ and lithium manganese spinel, $LiMn_2O_4$. The former composite presents significant safety concerns due to the very high oxidizing potential of Ni(IV). The latter composite is significantly less oxidizing than the Ni(IV) lithium battery and leads to far better redox kinetics and much higher power densities than the nickel cobaltate cathode.

The separator for the lithium battery often is a microporous polymer film. Examples of polymers for forming films include: nylon, cellulose, nitrocellulose, polysulfone, polyacrylonitrile, potyvinylidene fluoride, polypropylene, polyethylene, polybutene, etc. Recently ceramic separators, based on silicates, have also been used.

The battery is not limited to particular shapes, and can take any appropriate shape such as cylindrical shape, a coin shape, and a square shape. The battery is also not limited to particular capacities, and can have any appropriate capacity for both small appliances and power storage for electric cars.

The following examples are intended to illustrate various embodiments of the invention and are not intended to restrict the scope thereof.

EXAMPLE 1

Preparation of $Li_2B_{12}F_xH_{12-x}$, where $x=10\text{-}12$

A colorless slurry containing 2.96 g (11.8 mmol) $K_2B_{12}H_{12}\cdot CH_3OH$ in 6 ml formic acid at an average Hammett acidity of $H_o=-2$ to $-4$ was fluorinated at 0 to 20° C. When 100% of the desired $F_2$ (142 mmol) was added as a mixture of 10% $F_2$/10% $O_2$/80% $N_2$, a colorless solution remained. Further fluorination (3%) at 30° C. resulted in precipitation of solid from solution. Solvents were evacuated overnight, leaving 5.1 g of a colorless, friable solid. Analysis of this crude product by $^{19}F$ NMR revealed primarily $B_{12}F_{10}H_2^{2-}$ (60%), $B_{12}F_{11}H^{2-}$ (35%), and $B_{12}F_{12}^{2-}$ (5%). The crude reaction product was dissolved in water and the pH of the solution adjusted to between 4-6 with triethylamine and triethylamine hydrochloride. The precipitated product was filtered, dried, and resuspended in water. Two equivalents of lithium hydroxide monohydrate were added to the slurry and the resulting triethylamine evacuated. Additional lithium hydroxide was added until the pH of the final solution remained at 9-10 after distillation of all triethylamine. Water was removed by distillation and the final product was vacuum-dried at 200° C. for 4-8 hrs. Typical yields of $Li_2B_{12}F_xH_{12-x}$ (x=10, 11, 12) were ~75%.

EXAMPLE 2

Preparation of $Li_2B_{12}F_xBr_{12-x}$ ($x \geq 10$, ave. $x=11$)

3 g $Li_2B_{12}F_xH_{12-x}$ ($x \geq 10$) (0.008 mol) of average composition $Li_2B_{12}F_{11}H$ was dissolved in 160 mL of 1 M $HCl_{(aq)}$. $Br_2$, 1.4 mL (0.027 mol) was added and the mixture refluxed at 100° C. for 4 hours. A sample was taken for NMR analysis.

A portion of the above sample was returned to reflux and chlorine was added over a period of 6 hrs to form the more potent brominating agent BrCl. At the completion of chlorine addition, an aliquot was taken and NMR analysis showed the composition of the aliquot to be identical to the composition of the first aliquot. HCl and water were distilled away and the product was vacuum dried at 150° C. A total of 2.55 g white solid product was isolated. Theoretical for $Li_2B_{12}F_xH_{12-x}$ ($x \geq 10$, ave. $x=11$) is 3.66 g.

EXAMPLE 3

Preparation of $Li_2B_{12}F_xCl_{12-x}$ (ave. $x=11$)

20 g $Li_2B_{12}F_{11}H$ mixture dissolved in 160 mL 1 M HCl in a three neck round bottom flask fitted with a reflux condenser and fritted bubbler. The mixture was heated to 100° C. and $Cl_2$ gas was bubbled through at 15 standard cubic centimeter (sccm/min). The effluent, through the condenser, was passed through a solution of KOH and $Na_2SO_3$. After 16 hours of bubbling $Cl_2$, the solution was purged with air. The HCl and water were distilled out and the residue was tritrated with ether. Upon ether evaporation and vacuum oven drying of the white solid, 20 g of material of the above formula were recovered (92%). $^{19}F$-NMR in $D_2O$: $-260.5$, 0.035 F; $-262.0$, 0.082 F; $-263.0$, 0.022 F; $-264.5$, 0.344 F; $-265.5$, 0.066 F; $-267.0$, 0.308 F; $-268.0$, 0.022 F; $-269.5$, 1.0 F. $^{11}B$-NMR in $D_2O$: $-16.841$; $-17.878$

EXAMPLE 4

Preparation of $Li_2B_{12}F_xCl_{12-x}$ (ave. $x=3$)

3.78 g $K_2B_{12}F_3H_9$ mixture was dissolved in 100 mL 1M HCl in a three neck round bottom flask fitted with a reflux condenser and fritted bubbler. The mixture was heated to 100° C. and $Cl_2$ gas was bubbled through at 15 sccm. The effluent, through the condenser was passed through a solution of KOH and $Na_2SO_3$. After 8 hours of bubbling $Cl_2$, the solution was purged with air. There was some precipitate that formed and it was filtered out. The solution was brought to a pH of 9 by the addition of $Et_3N$ which produced a white precipitate. The solution was cooled to 0° C. to maximize precipitation and then filtered on a Buchner funnel and washed with cold water. The solid was dried in a vacuum at 120° C. 4.62 g of a composition of the above formula was recovered. $^{19}F$-NMR in acetone-$d_6$: $-225.2$, 0.023 F; $-228.5$, 0.078 F; $-229.5$, 0.082 F; $-231.2$, 0.036 F; $-232.8$, 0.302 F; $-233.2$, 0.073 F; $-234.3$, 0.032 F; $-235.5$, 0.104 F; $-237.6$, 0.239 F; $-238.4$, 0.037 F; $-239.8$, 0.057 F; $-242.0$, 0.033 F. $^{11}B$-NMR in acetone-$d_6$: $-6$ multiplet; $-15$ multiplet.

EXAMPLE 5

Preparation of $Li_2B_{12}F_xCl_{12-x}$ (ave. $x=11$)

3 g $Li_2B_{12}F_{11}H$ mixture dissolved in 110 mL 1 M HCl in a three neck round bottom flask fitted with a reflux condenser and fritted bubbler. 1.4 mL $Br_2$ was added. The mixture was heated to 100° C. for 4 hours. An aliquot was removed for NMR analysis. The mixture was again heated to 100° C. and $Cl_2$ gas was bubbled through at 15 sccm. The effluent, through the condenser was passed through a solution of KOH and $Na_2SO_3$. After half an hour, the red $Br_2$ solution was yellowish. After another 6 hours of bubbling $Cl_2$, the solution was purged with air. An aliquot was taken for 19F NMR and found to be identical to the first sample. HCl and water were distilled out. The residue was vacuum dried at 150 C. 2.55 g of a composition of the above formula were recovered. $^{19}$F-NMR in D$_2$O: −257.8, 0.024 F; −259.0, 0.039 F; −259.5, 0.040 F; −261.0, 0.028 F; −261.5, 0.028 F; −263.0, 0.321 F; −265.2, 0.382 F; −269.2, 1.0 F.

EXAMPLE 6

Preparation of Li$_2$B$_{12}$F$_x$C$_{12-x}$ (ave. x=3)

2.48 g K$_2$B$_{12}$F$_3$H$_9$ mixture was dissolved in 100 mL 1M HCl in a round bottom flask fitted with a reflux condenser. The mixture was heated to 100° C. After 8 hours of stirring, the solution was cooled to room temperature and left over the weekend. The excess Br$_2$ was neutralized with Na$_2$SO$_3$ and the solution was brought to a pH of 9 by the addition of Et$_3$N which produced a white precipitate. The solution was cooled to 0° C. to maximize precipitation and then filtered on a Buchner funnel and washed with cold water. The solid was dried in a vacuum at 120° C. $^{19}$F-NMR in acetone-d$_6$: −212.2, 0.030 F; −213.6, 0.284 F; −216, 0.100 F; −217.0, 0.100 F; −217.9, 0.100 F; −219.3, 1.0 F; −221.3, 0.201 F; −222.5, 0.311 F; −223.2, 0.100 F; −225.2, 0.100 F; −225.5, 0.639 F; −226.6, 0.149 F; −229, 0.245 F; −232.0, 0.120 F. Metathesis with LiOH.H$_2$O was carried out as in Example 1. A composition described by the above formula was obtained.

EXAMPLE 7

Conductivity of Lithium Electrolyte Solutions for Use in Lithium Secondary Batteries The conductivities of solutions of the Li$_2$B$_{12}$F$_x$Z$_{12-x}$ salts and pure Li$_2$B$_{12}$Cl$_{12}$ dissolved in a 50/50 wt. % ethylene carbonate (EC)/dimethyl carbonate (DMC) were determined using a Radiometer CDM210 conductivity meter and 2 pole CDC741T conductivity cell with build-in temperature sensor. The conductivity cell was calibrated using KCl solutions.

Figure 1:
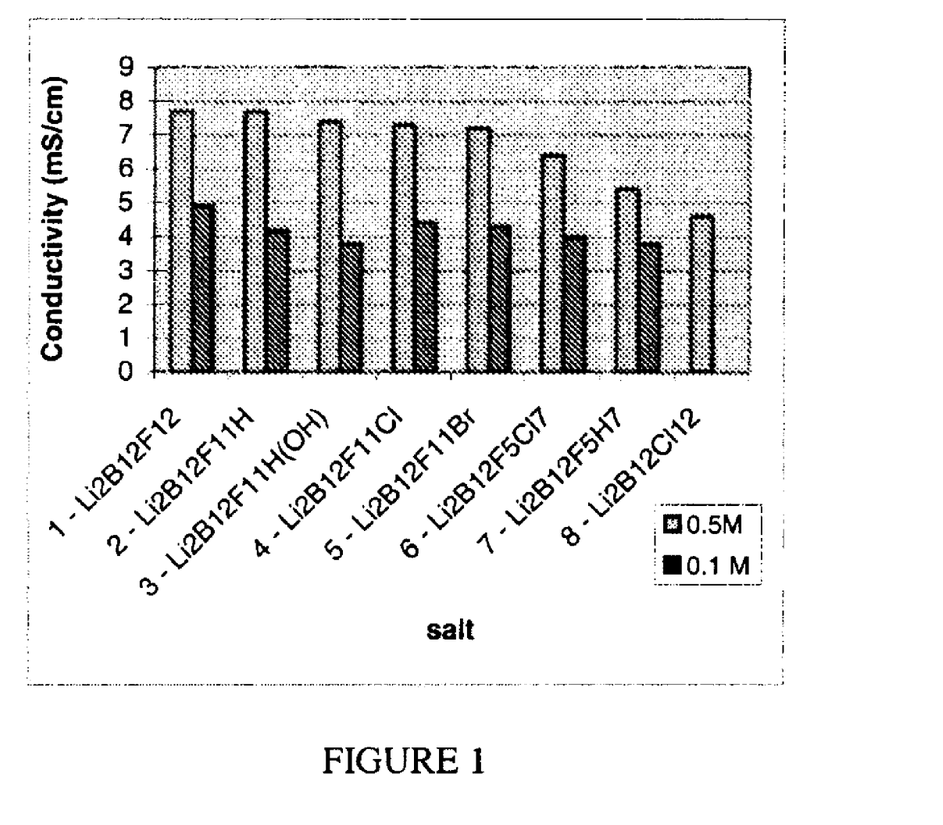
FIG. 1 is a graphical representation of conductivity of certain inventive electrolytes.

The conductivities, are shown in FIG. 1.

FIG. 1 shows that 0.5 M electrolyte solutions of salts of the anions having 5 or more fluorine atoms have excellent bulk conductivity. Surprisingly, the salt, Li$_2$B$_{12}$Cl$_{12}$, (Comparative sample 8) had the poorest conductivity of all the salts tested. At the 0.1 molar concentration, the conductivities were significantly poorer showing that commercial, large scale batteries would require higher salt concentrations.

Viewing the results in greater detail, it is unexpected that at comparable concentrations, Li$_2$B$_{12}$Cl$_{12}$ (Comparative sample 8) has a conductivity of only ~0.6× that of the conductivity of Li$_2$B$_{12}$F$_{12}$ (sample 1), even though B$_{12}$Cl$_{12}$$^{2-}$ is expected to be more weakly coordinating. Even more surprising is the fact that a 0.1M solution of Li$_2$B$_{12}$F$_{12}$ (sample 1) is more conducting than Li$_2$B$_{12}$Cl$_{12}$ (sample 8) at 5× the concentration. This effectively means that on a weight basis it takes ~10 times as much Li$_2$B$_{12}$Cl$_{12}$ as Li$_2$B$_{12}$F$_{12}$ in an EC/DMC mixture to achieve the same ionic conductivity.

Not revealed from FIG. 1 is the relationship of the viscosity of the solutions to the bulk conductivity of the electrolyte. Under the test conditions, all of the fluorinated dodecaborates exhibited a viscosity similar to water, i.e., the solutions were pourable. On the other hand, as the concentration of halogen atoms other than fluorine increased in the lithium fluoroborate, the viscosity of the resulting solutions formed from the lithium based fluoroborate increased substantially. The bulk conductivity of the resulting solution also decreased dramatically. For example, the salt, Li$_2$B$_{12}$Cl$_{12}$, at a 0.5 M level was too viscous and too low in bulk conductivity to be of commercial value.

In summary, the fully chlorinated lithium salt (Li$_2$B$_{12}$Cl$_{12}$) when evaluated as an electrolyte salt for a lithium battery has a conductivity at useful concentrations in typical aprotic electrolytes which is relatively low (4.6 mS/cm at 0.5M in 50/50 EC/DMC). On the other hand, and quite unexpectedly, Li$_2$B$_{12}$F$_{12}$ and the mixtures of salts Li$_2$B$_{12}$F$_x$(H, Cl, Br)$_{12-x}$ give rise to 0.5M solutions in EC/DMC of substantially greater conductivity than the fully chlorinated derivative (7.2-7.7 mS/cm). This result is surprising in view of the fact that the smaller B$_{12}$F$_x$(H, Cl, Br)$_{12-x}$$^{2-}$ anions were not expected to be as weakly coordinating as the B$_{12}$Cl$_{12}$$^{2-}$ anions.

EXAMPLE 8

Evaluation of Lithium-Based Electrolyte in Lithium Battery

In this example, a 2032 button cell battery configuration was used employing a lithium foil (− electrode)∥0.4-0.5M Li$_2$B$_{12}$F$_{12}$ in EC/DMC∥LiNi$_{0.8}$Co$_{0.15}$Al$_{0.05}$O$_2$(+ electrode). The cell was pulse charged and discharged using an Arbin Instruments BT4 series potentiostat to assess the area specific impedance (ASI) of the cell. Using this configuration, it was demonstrated that a 0.5 molar (M) solution of Li$_2$B$_{12}$F$_{12}$ in EC/DMC (3:7) allows equivalent or even slightly greater capacities than optimized electrolyte solutions employing 1.2 M LiPF$_6$ in the same cell configuration. More importantly in comparative tests it was seen that reducing the Li$_2$B$_{12}$F$_{12}$ concentration from 1 M to 0.5M reduces the ASI from 100Ω·cm$^2$ to 40Ω·cm$^2$ in this unoptimized solvent system. The highest electrolyte solution conductivity for Li$_2$B$_{12}$F$_{12}$ was observed at 0.4 M, and the conductivity at 0.3M was only slightly less than that at 0.5M. This suggested that it is possible to reduce concentration perhaps to a level of 0.3M or even 0.2 M and achieve the desired ASI without making any significant changes in solvent formulation. In fact it has been found that at a concentration of 0.4M in EC/DMC (3:7) the ASI remains at ~40Ω·cm$^2$.

EXAMPLE 9

Thermal Abuse Testing of Fully Charged Lithium-Ion Cells

Lithium-ion cells were fabricated and tested as in the previous example using a graphite rather than a lithium metal negative electrode according to the following configuration:

Graphite(− electrode)∥Li$_2$B$_{12}$F$_x$H$_{12-x}$/LiPF$_6$ in EC/DEC∥LiNi$_{0.8}$Co$_{0.15}$Al$_{0.05}$O$_2$(+ electrode)

Figure 2:
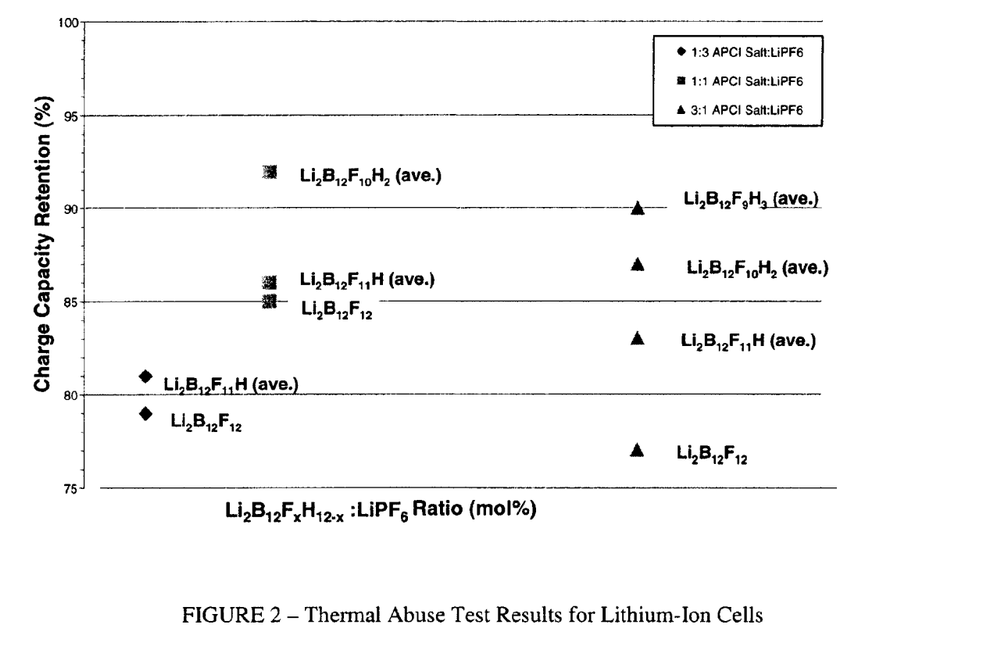
FIG. 2 is a graphical representation of thermal stability of batteries containing certain inventive electrolytes.

A number of different fluorododecaborate compositions were used (average x ranging from 9 to 12) and 3 different ratios of fluorododecaborate salt to hexafluorophosphate salt were used. Cells containing these solutions were tested according to the following profile. Using an Arbin Instruments potentiostat, the cells were charged and discharged through two 0.1 mAh (C/20 rate) formation cycles. The cells were then charged at 0.7 mAh (C/3 rate) to 4.1 V to determine pre-bake charge capacity. The open circuit potential of the cells was monitored for 2 hours as a quality control test. Only cells which remained at or above ~4V were used in the subsequent stages of this test. These cells were stored at 85° C. for 72 hours in their fully charged state. The cells were then discharged at 0.7 mAh (C/3 rate) to 3 V, and charged at the same rate back to 4.1 V to determine post heat treatment charge capacity. The ratio of post- to pre-heat treatment charge capacity was determined giving the % charge capacity retention. Such a test is a good accelerated measure of calendar and cycle-life stability. The higher the ratio of post- to pre-bake charge capacity the better the overall stability of the cell system. Results of these tests are shown in FIG. 2.

The data show that for all 3 dodecaborate:LiPF$_6$ ratios partially fluorinated (average x less than 12) mixtures of Li$_2$B$_{12}$F$_x$H$_{12-x}$ perform better than the fully fluorinated Li$_2$B$_{12}$F$_{12}$ in terms of charge capacity retention and hence stability.

$^{19}$F NMR analyses of electrolyte solution from the least stable Li$_2$B$_{12}$F$_{12}$ containing cells revealed that significant amounts of Li$_2$B$_{12}$F$_{12}$ had been cleanly reduced to Li$_2$B$_{12}$F$_{11}$H with only minor amounts of further reduction to Li$_2$B$_{12}$F$_{10}$H$_2$. Since this reduction must remove active lithium capacity from the cell, it suggests that the greater capacity losses for cells containing largely Li$_2$B$_{12}$F$_{12}$ may be due to the reductive instability of that salt in fully charged lithium ion cells.

However, in similar thermal abuse tests using propylene carbonate as solvent no reduction of Li$_2$B$_{12}$F$_{12}$ is observed suggesting that Li$_2$B$_{12}$F$_{12}$ will have suitable reductive stability for some lithium-ion cell configurations.

EXAMPLE 10

Determination of Oxidative and Reductive Stability and Decomposition Temperature, of Lithium Electrolyte Solutions for Use in Lithium Secondary Batteries To assess the oxidative stability of substituted dodecaborates as possible electrolytes, cyclic voltammetry (CV) experiments were performed using CH Instruments potentiostat and a conventional three-electrode cell under laboratory atmosphere. The working electrode was a platinum disc electrode (2 mm) and potentials were referenced to a Ag/Ag$^+$ reference electrode (silver wire immersed into 0.01 M AgNO$_3$ in 0.1 M acetonitrile [(n-Bu)$_4$N][BF$_4$] in a glass tube fitted with a Vycor tip). The reference electrode was calibrated to be 0.32 V versus the normal hydrogen electrode (NHE) using a ferrocene standard (E$_{1/2}$(FeCp$_2$/FeCp$_2$$^+$) =0.08 V under described conditions). The electrolyte solutions were 0.01 M solutions of [(n-Bu)$_4$N][A] (A=anion of interest) in 0.1 M acetonitrile solution of [(n-Bu)$_4$N][BF$_4$].

The relative reductive stability was calculated as the electron affinity (EA) using Density Functional Theory (DFT) computational methods. All DFT calculations were performed with the DMol software package. The electron affinities (EA) are the energies required to push an electron from "infinity" on to the doubly charged anion in the gas phase and a higher positive electron affinity (here calculated in eV) is associated with greater stability toward reduction.

The decomposition temperature was determined by DSC measurements on a TA Instruments DC2910 Differential Scanning Calorimeter.

TABLE 1

Oxidation, Decomposition Temp. (Stability) And Conductivity Of Lithium Electrolytes.

| Compound | Molecular wt. | Conductivity (mS/cm)$^a$ | Decomp. Temp. (° C.) | Oxidation Potential E$_{1/2}$ (V) vs. NHE; {~vs Li}; (reversible ?) |
|---|---|---|---|---|
| Li$_2$B$_{12}$Cl$_{12}$ | 569.5 | 4.6 (0.5M) | >400 | >2.2 {>5.3}; ? |
| Li$_2$B$_{12}$F$_{12}$ | 371.6 | 7.7 (0.5M) 6.0 (0.25M) 4.9 (0.1M) | 465 | 1.87 {4.9}; (yes) |
| Li$_2$B$_{12}$F$_x$H$_{12-x}$ (x ≧ 10) Average x = 11 | 353.6 | 7.7 (0.5M) 4.2 (0.1M) | 465 | 1.73 {4.7}; (yes) |
| Li$_2$B$_{12}$F$_x$Cl$_{12-x}$ (x ≧ 10) Average x = 11 | 388.1 | 7.3 (0.5M) 4.4 (0.1M) | — | 1.98 {5.1}; (yes) |
| Li$_2$B$_{12}$F$_x$Br$_{12-x}$ (x ≧ 10) Average x = 11 | 432.5 | 7.2 (0.5) 4.3 (0.1) | — | — |
| Li$_2$B$_{12}$F$_x$H$_{12-x}$ (x ≧ 10) Average x = 11 Contains 5% Li$_2$B$_{12}$F$_x$(OH)$_{12-x}$ (x = 10, 11) | ~353.6 | 7.4 (0.5) 4.0 (0.1) | 465 | |
| B$_{12}$F$_{10}$(OH)$_2$$^{2-}$ | | | — | 1.28 {4.2}; (yes) |
| Li$_2$B$_{12}$F$_5$H$_7$ | | | >400 | 1.6 {4.6}; (yes) |
| Li$_2$B$_{12}$F$_3$H$_9$ | | | >400 | 1.5 {4.5}; (no) |
| B$_{10}$C$_{10}$$^{2-}$* | | | | 1.35; (yes) |

*B$_{10}$Cl$_{10}$$^{2-}$ is a literature value

TABLE 2

Calculated electron affinities for halogenated dodecaborate salts

| Molecule | EA (eV) |
|---|---|
| B$_{12}$Cl$_{12}$ (2-) | 5.04 |
| B$_{12}$F$_{12}$ (2-) | 6.24 |
| B$_{12}$H$_{12}$ (2-) | 10.4 |
| B$_{12}$F$_{11}$Cl (2-) | 5.79 |
| B$_{12}$F$_{10}$Cl$_2$ (2-) | 5.92 |
| B$_{12}$F$_{11}$(OH) (2-) | 6.32 |
| B$_{12}$F$_{10}$(OH)$_2$ (2-) | 6.40 |
| B$_{12}$F$_{10}$(OCF$_3$)$_2$ (2-) | 5.52 |
| B$_{12}$F$_{11}$H (2-) | 6.66 |
| B$_{12}$F$_{10}$H$_2$ (2-) | 7.09 |
| B$_{12}$F$_9$H$_3$ (2-) | 7.57 |
| B$_{12}$F$_8$H$_4$ (2-) | 7.99 |

Table 1 shows that the oxidative stabilities of the pure $Li_2B_{12}Cl_{12}$ (Comparative Sample), $Li_2B_{12}F_{12}$ and other salts of the invention are sufficiently high to evaluate them as potential lithium battery electrolytes. From Table 1, it is interesting and unexpected that the oxidative stabilities of the $B_{12}Cl_{12}^{2-}$ anion and the $Li_2B_{12}F_xCl_{12-x}$ ($x \geq 10$) salt mixture were higher than that of the fully fluorinated anion $B_{12}F_{12}^{2-}$. Thus, the mixed salt compositions, $Li_2B_{12}F_xCl_{12-x}$ ($x \geq 10$) are observed to provide a unique combination of a high conductivity with even better oxidative stability than $Li_2B_{12}F_{12}$, possibly rendering them useful for both high power and high voltage battery applications. Although not intending to be bound by speculation, the decrease in oxidative stability of the fully fluorinated anion $B_{12}F_{12}^{2-}$ may be due to a π-back donation from fluorine atom to boron cluster. That analysis suggests that the $B_{12}Cl_{12}^{2-}$ anion may actually be a more weakly coordinating anion than $B_{12}F_{12}^{2-}$.

Table 1 also shows that the decomposition temperature of the of the fully fluorinated anion $B_{12}F_{12}^{2-}$ and of the fully fluorinated/halogenated anion, $B_{12}F_xZ_{12-x}^{2-}$, are at least 400° C. and thus resistant to decomposition under normal battery conditions for operation. With respect to oxidative stability, lithium battery electrolytes are required to have high electrochemical oxidative stability. For high voltage lithium ion batteries, electrolyte oxidation at greater than 4.2 V vs. lithium metal (1.2 V vs NHE) is required. Because, the measured $E_{1/2}$ is usually 0.2 to 0.4 V higher than the actual onset of oxidation, electrolyte stability to at least a measured $E_{1/2}$ of 1.4 to 1.6 V vs. NHE is desired. As can be seen from the data in Table 1, this stability is readily met for those lithium dodecaborate salts containing more than 3 fluorine atoms.

From the data in Table 1, it is also clear that while fluorinated lithium dodecaborates with as few as 3 fluorine atoms, may possess suitable oxidative stability for certain lithium ion applications, the fact that its first oxidation is irreversible, suggests that $Li_2B_{12}F_3H_9$ would slowly, but steadily be depleted on successive charging and discharging of a 4.2 V lithium ion battery. The $Li_2B_{12}F_4H_8$ has better oxidative stability and it is likely that its first oxidation is sufficiently reversible that this salt would have reasonable stability on repeated charge/discharge cycling.

Table 2 shows the calculated electron affinities of several substituted dodecaborate salts. The results mirror the oxidative stabilities. While the data in Table 1 indicate that it is harder to oxidize $B_{12}Cl_{12}^{2-}$ than $B_{12}F_{12}^{2-}$, it is significantly easier to reduce $B_{12}Cl_{12}^{2-}$ than $B_{12}F_{12}^{2-}$. Similarly, just as chlorine atom substitution increases the oxidation potential of these salts while hydrogen atom substitution reduces these potentials, the opposite is true of the electron affinity values. Substitution of fluorine atoms with chlorine makes the $B_{12}F_xZ_{12-x}^{2-}$ easier to reduce while subtitution of fluorine atoms with hydrogen make these salts harder to reduce, that is, $B_{12}F_{11}H^{2-}$ is harder to reduce than is $B_{12}F_{12}^{2-}$. Substitution with bis-trifluoromethoxy groups (—$OCF_3$) is similar in effect to chlorine substitution. Replacing F with OH marginally increases the EA, by an amount that is probably within the uncertainty of the method.

Based on these calculations and the thermal abuse cell stability results of example 9, it now appears that highly chlorinated dodecaborate salts, including $B_{12}Cl_2^{2-}$, because of their ease of reduction, relative to $B_{12}F_{12}^{2-}$, will have very poor stability in lithium ion cells.

Surprisingly, it also appears that the partially fluorinated lithium fluorododecaborate salts, $Li_2B_{12}F_xH_{12-x}$ (where $4 \leq x \leq 12$ or where $4 \leq x \leq 11$) have the optimal combination of oxidative and reductive stability for commercial lithium ion cells.

The invention claimed is:

1. A secondary battery comprising: a positive electrode, a negative electrode, an organic solvent comprising at least one carbonate,
a lithium salt of the formula:

$Li_2B_{12}F_xZ_{12-x}$ where x is greater than or equal to 8 and less than or equal to 12 and Z is Cl, or Br; and at least one member selected from the group consisting of LiPF6, lithium per chlorate, lithium hexafluoroaresenate, lithium tetrafluoroborate and lithium hexafluroantimonate.

2. The battery of claim 1 wherein x is 12.

3. The battery of claim 1 wherein x is less than 12 and Z is Cl, or Br.

4. The battery of claim 1 wherein the lithium salt is selected from the group consisting of $Li_2B_{12}F_8H_4$, $Li_2B_{12}F_9H_3$, $Li_2B_{12}F_{10}H_2$, $Li_2B_{12}F_{11}H$.

5. The battery of claim 2 wherein the concentration of said lithium salt in said solvent is from 0.01 to 1 molar.

6. The battery of claim 1 wherein said lithium salt is selected from the group consisting of $Li_2B_{12}F_xCl_{12-x}$ and $Li_2B_{12}F_xBr_{12-x}$ where x is 10 or 11.

7. The battery of claim 1 wherein said solvent is selected from the group consisting of ethylene carbonate, dimethyl carbonate, ethyl methyl carbonate, diethyl carbonate, methyl propyl carbonate, methyl trifluoroethyl carbonate, dimethoxyethane, diglyme, and triglyme, propylene carbonate, trifluoropropylene carbonate, chloroethylene carbonate, vinylene carbonate, butylene carbonate, dimethylvinylene carbonate, and aprotic gel polymers.

8. The battery of claim 1 wherein x is 10 and at least one Z is Cl.

9. The battery of claim 7 wherein x is 10 or 11 and Z is Cl or Br.

10. The battery of claim 1 wherein the positive electrode comprises at least one oxide.

11. The battery of claim 1 wherein the negative electrode comprises at least one member selected from the group consisting of carbon, tin oxide, silicon and germanium compounds.

12. The battery of claim 1 wherein the battery retains at least 75% of its charge capacity after being maintained at a temperature of 85 C for 72 hours.

13. An electrolyte for a secondary lithium battery comprising a first lithium salt, and at least one carbonate solvent, said first lithium salt comprising:

$Li_2B_{12}F_xZ_{12-x}$ wherein x is at least 10 but not more than 12 and Z is H, Cl, or Br, and at least one other lithium based salt.

14. The lithium electrolyte of claim 13 wherein x is at least 11.

15. The lithium electrolyte of claim 13 wherein the solvent is selected from the group consisting of ethylene carbonate, dimethyl carbonate, ethyl methyl carbonate, diethyl carbonate, methyl propyl carbonate, methyl trifluoroethyl carbonate, dimethoxyethane, diglyme, and triglyme, propylene carbonate, trifluoropropylene carbonate, chloroethylene carbonate, vinylene carbonate, butylene carbonate, dimethylvinylene carbonate, and an aprotic gel polymer, or polymer matrix.

16. The lithium electrolyte of claim 13 wherein the solvent is selected from the group consisting of ethylene carbonate, propylene carbonate, dimethyl carbonate and diethyl carbonate.

17. The lithium electrolyte of claim 13 wherein x is 10 or 11 and Z is Cl or Br.

18. The lithium electrolyte of claim 13 wherein x is 12.

19. The lithium electrolyte of claim 13 wherein said first lithium salt is selected from the group consisting of $Li_2B_{12}F_{10}H_2$, and $Li_2B_{12}F_{11}H$.

20. The lithium electrolyte of claim 13 wherein said at least one other lithium based salt comprises at least one member selected from the group consisting of LiPF6, lithium per chlorate, lithium hexafluoroaresenate, lithium tetrafluoroborate and lithium hexafluroantimonate.

21. The lithium electrolyte of claim 20 wherein said at least one member comprises LiPF6.

22. The electrolyte of claim 13 wherein said electrolyte has a conductivity of greater than about 4 mS/cm.

23. The electrolyte of claim 15 wherein the solvent comprises vinylene carbonate.

24. A secondary battery comprising:

a positive electrode comprising at least one oxide, a negative electrode, an organic solvent comprising at least one carbonate, a first lithium salt of the formula:

$$Li_2B_{12}F_xZ_{12-x}$$

where x is greater than or equal to 10 and less than or equal to 12 and Z is H, Cl, or Br; and at least one other lithium based salt.

25. The battery of claim 24 wherein the positive electrode comprises a lithium composite oxide.

26. The battery of claim 24 wherein the lithium composite oxide comprises lithium manganese spinel.

27. The battery of claim 26 wherein the negative electrode comprises carbon.

* * * * *

UNITED STATES PATENT AND TRADEMARK OFFICE
CERTIFICATE OF CORRECTION

| | | |
|---|---|---|
| PATENT NO. | : 7,348,103 B2 | Page 1 of 1 |
| APPLICATION NO. | : 10/924293 | |
| DATED | : March 25, 2008 | |
| INVENTOR(S) | : Sergei Vladimirovich Ivanov et al. | |

It is certified that error appears in the above-identified patent and that said Letters Patent is hereby corrected as shown below:

Column 12, Line 13

In claim 1 delete the words "Z is Cl" and insert the words -- Z is H, Cl, --

Signed and Sealed this

Eighth Day of July, 2008

JON W. DUDAS
*Director of the United States Patent and Trademark Office*